(12) United States Patent
Fischer et al.

(10) Patent No.: US 8,652,620 B2
(45) Date of Patent: Feb. 18, 2014

(54) SLIDING ELEMENT IN AN INTERNAL COMBUSTION ENGINE, IN PARTICULAR A PISTON RING

(75) Inventors: Manfred Fischer, Leichlingen (DE); Steffen Hoppe, Overath (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 273 days.

(21) Appl. No.: 13/123,580

(22) PCT Filed: Aug. 26, 2009

(86) PCT No.: PCT/EP2009/060987
§ 371 (c)(1),
(2), (4) Date: Apr. 11, 2011

(87) PCT Pub. No.: WO2010/040596
PCT Pub. Date: Apr. 15, 2010

(65) Prior Publication Data
US 2011/0268946 A1 Nov. 3, 2011

(30) Foreign Application Priority Data

Oct. 10, 2008 (DE) .......................... 10 2008 042 747

(51) Int. Cl.
*B32B 7/02* (2006.01)
(52) U.S. Cl.
USPC ........... 428/212; 428/217; 428/220; 277/442; 277/444

(58) Field of Classification Search
USPC ........ 428/212, 217, 220, 411.1; 277/442, 444
See application file for complete search history.

(56) References Cited

U.S. PATENT DOCUMENTS

| | | | |
|---|---|---|---|
| 6,815,054 B1 * | 11/2004 | Liu et al. ....................... | 428/835 |
| 2004/0258547 A1 * | 12/2004 | Burger et al. ................. | 417/471 |
| 2008/0095939 A1 * | 4/2008 | Fischer et al. ......... | 427/255.394 |
| 2009/0001669 A1 | 1/2009 | Hoppe et al. | |
| 2010/0044968 A1 | 2/2010 | Fischer et al. | |

FOREIGN PATENT DOCUMENTS

| | | |
|---|---|---|
| DE | 296 05 66 U1 | 7/1996 |
| DE | 19825860 A1 | 12/1999 |
| JP | 2003026414 A | 1/2003 |
| JP | 2008241032 A | 10/2008 |
| WO | 2006005200 A1 | 1/2006 |
| WO | WO 2006/125683 A1 | 11/2006 |
| WO | WO 2007/020139 A1 | 2/2007 |

\* cited by examiner

*Primary Examiner* — Mark Ruthkosky
*Assistant Examiner* — Lawrence Ferguson
(74) *Attorney, Agent, or Firm* — Robert L. Stearns; Dickinson Wright, PLLC

(57) ABSTRACT

A sliding element in an internal combustion engine has a coating which has the following layers from the outside inwards: a first carbon-based layer, a second carbon-based layer which is harder and/or has a smaller proportion of hydrogen than the first carbon-based layer, a PVD layer and a bonding layer.

13 Claims, No Drawings

SLIDING ELEMENT IN AN INTERNAL COMBUSTION ENGINE, IN PARTICULAR A PISTON RING

BACKGROUND OF THE INVENTION

1. Technical Field

The invention relates to a sliding element in an internal combustion engine, in particular a piston ring.

The fuel consumption of an internal combustion engine and therefore its $CO_2$ emission depends significantly on the friction losses in the engine. In this case, a large proportion of the friction losses occur on the piston assembly and in particular on the piston rings. In this respect, efforts are made in the field of internal combustion engines to construct every sliding element in an internal combustion engine, i.e. the piston, the piston rings and the cylinder liners, so as to be low-friction. It is also desirable to create good running-in behavior for the elements and to achieve comparatively low friction over the engine's entire service life.

2. Prior Art

A sliding element which has a wear layer and a run-in layer and preferably also a metallic intermediate layer situated between the layers emerges from DE 10 2005 063 123 B3.

SUMMARY OF THE INVENTION

The object of the invention is to create a sliding element for an internal combustion engine, in particular a piston ring, which combines favorable running-in behavior with a permanently low coefficient of friction.

Accordingly, a sliding element in an internal combustion engine is presented, such as a piston, a cylinder liner, but in particular a piston ring, having a coating which has at least the following layers from the outside inwards: a first carbon-based layer, a second carbon-based layer which is harder and/or has a smaller proportion of hydrogen than the first carbon-based layer, a PVD layer and a bonding layer.

The first, outermost carbon-based layer is comparatively soft, particularly when compared to the second carbon-based layer, but has favorable friction behavior, In an advantageous manner, it also has increased wear resistance in relation to the known DLC (diamond-like carbon) layers, These advantages may be achieved by means of particularly appropriate deposition processes and parameters. In an advantageous manner, the outermost carbon-based layer described may be modified per se in order to achieve good running-in behavior, in other words running-in of the piston ring with the cylinder liner, for example, is optimized.

In an advantageous manner, the second carbon-based layer situated beneath it achieves good connection and bonding of the two carbon-based layers to the adjoining PVD layer. At least one of the carbon-based layers may be executed as a DLC layer. Both carbon-based layers are preferably comparatively thin such that they have a limited service life and can be used as a run-in layer.

A PVD (physical vapor deposition) layer is provided as a "long-term" outermost layer, By creating a specific porosity, it is possible to achieve a favorable coefficient of friction which is advantageously in the order of magnitude of the carbon-based run-in layers. It has transpired in tests that such a coefficient of friction arises due to the presence of the two carbon-based layers without any troublesome running-in behavior. The PVD layer is comparatively thick; for example, it has a minimum layer thickness of 10 µm and is consequently durable and wear-resistant. In this way, the required service life is achieved.

Finally, a bonding layer is provided to the base material of the sliding element, for example, of the piston ring, which may be steel, cast iron or other suitable material. Overall, it may be considered that the basic idea of the invention is that for the first time ever a sliding element of an internal combustion engine has four or more layers, In particular, the favorable coefficient of friction and good running-in behavior of carbon-based layers is combined with the wear resistance of a PVD layer. A further innovation is that the outermost carbon-based layer is differentiated into a first and a second layer having the properties and features described. In particular, in view of this differentiation, the innermost (bonding) layer need not necessarily be present.

The first and/or second carbon-based layer is preferably a layer of the type a-C:H.

A third carbon-based layer containing metal is preferably provided between the inner, second carbon-based layer and the PVD layer.

A layer of the type a-C:H:W, which accordingly contains tungsten or another suitable metal, has proven to be particularly favorable.

For the required running-in behavior with simultaneously favorable coefficients of friction, a thickness of ≥3 and/or ≤5 µm has proven to be beneficial for the first and second carbon-based layer, including the third carbon-based layer where appropriate.

To ensure a favorable coefficient of friction over the entire service life, it is preferable that the PVD layer has a coefficient of friction in the order of magnitude of at least one of the carbon-based layers.

In particular, this may be in the region of 0.02 (on gray cast iron).

For the PVD layer, particularly good experience has been gained with a layer of the type CrN which is accordingly based on chromium nitride. In the case of the chromium nitride-based layer, it may be a layer in accordance with GOE 243 (the applicant's material specification).

A layer thickness for the PVD layer of at least 10 µm is currently preferred to achieve the required service life in an advantageous manner.

In respect of the bonding layer, particularly good properties have emerged in tests with a metallic layer, in particular a chromium layer.

Finally, layer thicknesses of ≤0.5 µm have proven to be beneficial for the bonding layer.

The invention claimed is:

1. Sliding element of an internal combustion engine, having a coating which has at least the following layers from the outside inwards:
   a first carbon-based layer,
   a second carbon-based layer which is harder and/or has a smaller proportion of hydrogen than the first carbon-based layer,
   a PVD layer, wherein the PVD layer has a layer thickness of ≥10 µm, and
   a bonding layer.

2. The sliding element according to claim 1, wherein the sliding element is a piston ring.

3. The sliding element according to claim 2, wherein a third carbon-based layer containing metal is provided between the second carbon-based layer and the PVD layer.

4. The sliding element according to claim 3, wherein the third carbon-based layer is a layer of the type a-C:H:W.

5. The sliding element according to claim 2, wherein the coating thickness of the first and second carbon-based layer is ≥3 µm and/or ≤5 µm.

6. The sliding element according to claim 2, wherein the PVD layer has a coefficient of friction, which is essentially identical to the coefficient of friction of at least one of the carbon-based layers.

7. The sliding element according to claim 2, wherein the PVD layer has a coefficient of friction of about 0.02 on gray cast iron.

8. The sliding element according to claim 2, wherein the PVD layer is a layer of the type CrN.

9. The sliding element according to claim 2, wherein the bonding layer is a metallic layer.

10. The sliding element according to claim 2, wherein the bonding layer has a layer thickness of ≤0.5 μm.

11. The sliding according to claim 2, wherein, the first and/or second carbon-based layer is a layer of the type a-C:H.

12. The sliding element according to claim 3, wherein the coating thickness of the first, second and third carbon-based layers is ≥3 μm and/or ≤5 μm.

13. The sliding element according to claim 9, wherein the metallic bonding layer comprises a chromium layer.

* * * * *